June 14, 1938.  C. G. KRONMILLER  2,120,427

MOTOR

Filed July 24, 1936

Inventor
Carl G. Kronmiller
By George H Fisher
Attorney

Patented June 14, 1938

2,120,427

UNITED STATES PATENT OFFICE 2,120,427

MOTOR

Carl G. Kronmiller, Minneapolis, Minn., assignor to Minneapolis-Honeywell Regulator Company, Minneapolis, Minn., a corporation of Delaware Application July 24, 1936, Serial No. 92,327

8 Claims. (Cl. 171—252)

My invention relates to a motor and more particularly to improvements in the bearing structure thereof. It is highly desirable in a motor to reduce the bearing friction to as low a value as possible and to insure that under no conditions will the bearings stick due to the motor heating up. This is especially important where the motor is of the "fly back" type wherein the motor drives apparatus in one direction and a spring returns the apparatus in the other direction rotating the motor in the process. An example of such a use is shown in the patent to Shivers No. 1,678,202 of July 24, 1928. This patent relates to a valve of a type wherein a motor drives the valve to open position and a spring returns the valve to closed position rotating the motor and the entire gear train in so doing. It will be obvious that if the motor does not rotate freely, the spring will be unable to move the valve to closed position due to the fact that the motor is at the high speed end and any small amount of friction in the bearings will result in a considerable force at the point where the spring acts in opposition to the motor. Inasmuch as such valves are quite frequently used for the control of fuel, the failure of these valves to close due to the bearings sticking may lead to disastrous consequences.

The present invention is particularly concerned in a motor adapted for use in apparatus of the type disclosed in the above mentioned Shivers patent. The improvements in the motor, however, are broadly applicable to any motor and applicant is not to be limited to any particular use of the motor.

One object of the present invention is to provide a motor comprising a core, a rotor, and a plurality of end bearing plates, wherein the spacing between the bearing plates is fixed regardless of the thickness of the core.

A further object of the present invention is to provide a motor employing a novel oil feeding method wherein oil is applied to the shaft with a minimum amount of friction being imparted thereto by reason of the oil applying means.

A further object of the present invention is to provide bearing plates which are secured at three different points so as to provide a secure mounting without any danger of distortion of the bearing plates.

Figure 1:
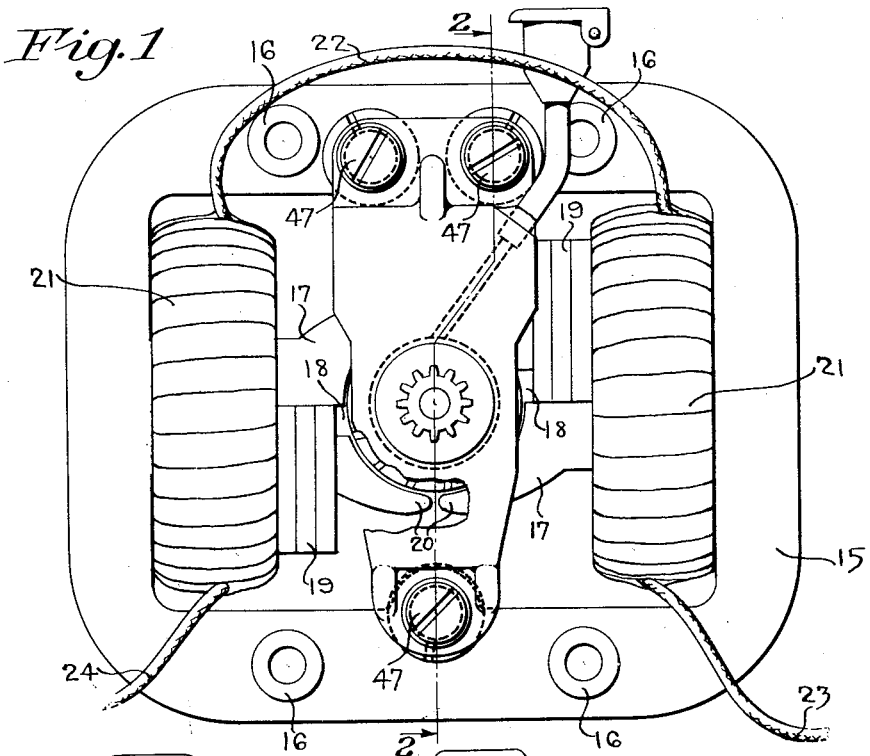
Figure 2:
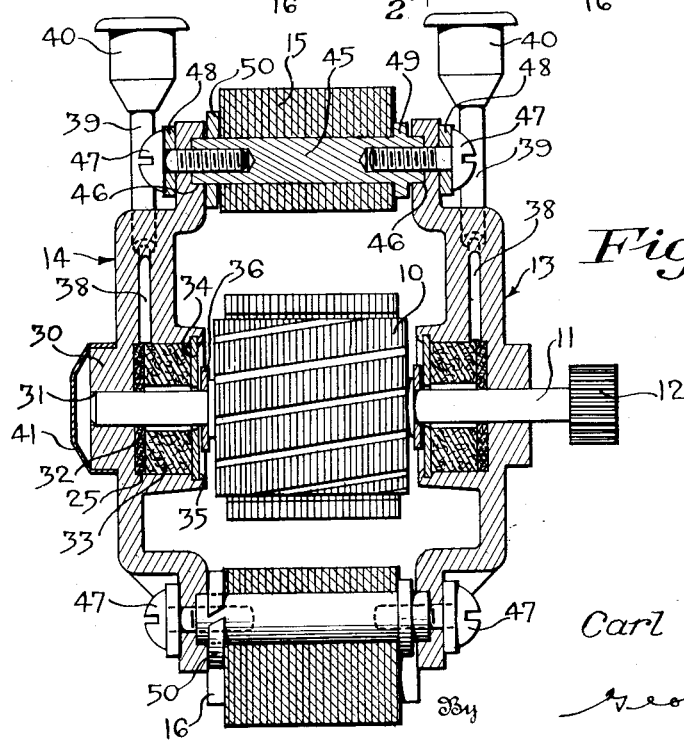

Other objects of the present invention will be apparent from a consideration of the accompanying specification, claims and drawing, of which Figure 1 is an elevational view of my improved motor with a portion broken away, and Figure 2 is a sectional view of the section taken along line 2—2 of Figure 1.

For purposes of illustration the novel features of the present invention are shown as applied to an induction motor. It is to be understood, however, that the invention is not so limited and that the novel features thereof are broadly applicable to any type of motor.

Referring to the drawing, a rotor is indicated by the reference numeral 10. This is shown as being of the conventional squirrel cage type. The rotor is secured on a shaft 11 and on the end of shaft 11 is a pinion gear 12 for driving apparatus to be operated by the rotor. The shaft 11 is rotatably mounted in end bearing plates 13 and 14 which are secured to a core 15.

The core 15 is of the laminated type and comprises a plurality of laminations secured together by rivets 16. The core 15 is in the form of a rectangular frame having pole pieces 17 secured thereto. These pole pieces are each slit as at 18 to provide two pole portions. Secured over one portion of each pole are shading rings 19. These rings are of good conducting material, as is usual in the art. Each portion of each pole 17 is provided with an elongated pole face 20.

Secured on each of pole pieces 17 is a field coil 21 and these two coils are connected together by a conductor 22. Terminal conductors 23 and 24 extend from the field coils 21 and are adapted to be connected to a suitable source of power for operating the motor.

Inasmuch as the structure of the end bearing members 13 and 14 is the same with the exception that one of the members is designed to go on the right-hand side and the other on the left-hand side, only the structure of bearing plate 14 will be specifically described. It will be noted that this bearing plate is provided with an enlarged bearing portion 30 and an aperture 31 extends through this portion and is designed to receive the shaft 11. The bearing portion 30 is further provided with an enlarged cylindrical recess 25 concentric with the axis of aperture 31. Fitted in this recess is a thin felt washer 32 which is of a size such that it bears against shaft 31. Disposed adjacent this washer 32 is a large felt washer 33. Another washer 34 which is preferably of the same material as the end bearing plate 14, which may be brass, is placed in the recess 25 and the inner ends of the bearing portion 30 are spun over as at 35 to retain washer 34 in position. The washer 34 serves to retain washers 32 and 33 in position. A washer 36 which may be of steel or other suitable hard material is loosely mounted on shaft 11 and serves to protect the end of the rotor from rubbing with washer 34. Secured over the end of bearing portion 30 of plate 14 is a cap 41 which serves to prevent the entrance of dust or other foreign matter into the space adjacent shaft 11.

The thin felt washer 32 is of relatively soft felt and serves to feed oil to the shaft 11. The thick felt washer 33 is of comparatively hard felt and serves to store the oil which is fed to the shaft 11 by the soft felt washer 32. The oil is supplied to these two washers through an oil channel 38 extending through the bearing plate. This channel 38 communicates with a pipe 39 which has secured thereto an oil cup 40 of any conventional type. By providing a relatively thin soft felt washer to feed the oil to the shaft and by making the washer which stores the oil and which necessarily must be of a relatively large size, of an internal diameter greater than the diameter of the shaft it is possible to have oil continuously fed to the shaft with a very minimum of friction due to the presence of the felt washers. Moreover, it is possible to employ a rather hard felt washer to store the oil and still not produce an excessive amount of friction on the shaft by reason of the hardness of this felt washer.

Extending through the core 15 are a plurality of rod-like spacers 45. The end bearing plates 13 and 14 are provided with cylindrical recesses 46 which receive the ends of spacers 45. The end bearing plates are secured to spacers 45 by screws 47. Some means, such as lock washers 48, may be employed to prevent loosening of the screws 47. It will be readily seen that by insuring that the spacers 45 are of a predetermined length and that the recesses 46 are of a predetermined depth the spacing between members 13 and 14 can be very accurately controlled. By so controlling this spacing the end play permitted the rotor 10 is thereby accurately controlled. This is highly important as is well known in the motor art.

Secured to each of the spacers 45 is a collar 49 and interposed between the core 15 and the end bearing plate 14 is a lock washer 50. This washer 50 acts as a spring which serves to urge core 15 against the collar 49. In this manner the core 15 is firmly secured with respect to end plates 13 and 14 while at the same time any variations in thickness thereof do not affect the spacing of bearing plates 13 and 14 and consequently of the end play permitted the rotor. It is almost impossible to very accurately control the thickness of a laminated core due to the fact that there are quite a large number of individual laminations and the errors in the thickness of these laminations may be cumulative in certain cases. Without some arrangement such as employed in the present structure it has been found that quite a large variation in end play occurs. This often results in insufficient end play with the result that upon heating up, the motor tends to stick. With the present invention it is possible to very accurately control this amount of end play and hence to avoid this possibility.

It will further be noted in Figure 1 that the end bearing plates are fastened at three separate points by the screws 47. In this manner the end bearing plates 13 and 14 are firmly secured with respect to the core and at the same time there is no danger of distortion of the same so as to cause a binding on the shaft 11.

It will be seen that by reason of the novel oil feeding construction the method of very accurately controlling the end play permitted the rotor regardless of the thickness of the core and by the mounting of the bearing construction, there is provided a motor which is remarkably free from the normal bearing defects which lead to sticking of the motor when heated up.

While I have shown a particular employment of my invention, it is to be understood that this is only for purposes of illustration and my invention is to be limited only by the scope of the appended claims.

I claim as my invention:

1. In a motor, a rotor, a shaft for the same, a core adapted to cooperate with said rotor, end bearing plates for supporting said shaft, and means for clamping said core between said end plates in assembled relation therewith with a fixed spacing between said end plates regardless of the thickness of said core.

2. In a motor, a rotor, a shaft for the same, a core adapted to cooperate with said rotor, end bearing plates for supporting said shaft, means for clamping said core between said end plates in assembled relation therewith, said means comprising a spacer of predetermined length, and means to clamp said end plates to said spacer and to secure said core in a predetermined position with respect to one of said end plates independently of the thickness of said core.

3. In a motor, a rotor, means for rotatably supporting the same comprising a plurality of end plates, a laminated core member, means for clamping said end plates and said core in cooperative relationship with said rotor, with said core secured between said end plates and said end plates spaced a predetermined distance apart regardless of the thickness of said core to provide a fixed amount of end play for said rotor between said end plates.

4. In a motor, a rotor, a shaft for the same, a core adapted to cooperate with said rotor, end bearing plates for supporting said shaft, a spacer of predetermined length, means for rigidly clamping said end plates against said spacer and for yieldably clamping said core between said plates.

5. In a motor, a rotor, a shaft for the same, a core adapted to cooperate with said rotor, end bearing plates for supporting said shaft, means for clamping said core between said end plates in assembled relation therewith at three spaced points with a fixed spacing between said end plates at each point regardless of the thickness of said core.

6. In a motor, a rotor, a shaft for the same, a core adapted to cooperate with said rotor, end bearing plates for supporting said shaft with respect to said core, means for clamping said core between said end plates in assembled relation therewith, said means comprising a plurality of spacers of predetermined length extending through apertures in said core, a shoulder on each of said spacers adjacent one end thereof, means to clamp said end plates to said spacers, and springs interposed between the end plate remote from said shoulders and said core to urge said core against said shoulders.

7. In a motor, a rotor, a shaft for the same, a core adapted to cooperate with said rotor, end bearing plates for supporting said shaft with respect to said core, means for clamping said core between said end plates in assembled relation therewith, said means comprising three spacers of predetermined length extending through apertures in said core, a shoulder on each of said spacers adjacent one end thereof, means to clamp said said end plates to said spacers, and springs interposed between the end plate remote from said shoulders and said core to urge said core against said shoulders.

8. In a motor, a rotor, a shaft for the same, a core adapted to cooperate with said rotor, end bearing plates for supporting said shaft with respect to said core, means for clamping said core between said end plates in assembled relation therewith, said means comprising a plurality of spacers of predetermined length extending through apertures in said core, a shoulder on each of said spacers adjacent one end thereof, means to clamp said end plates to said spacers, and lock washers interposed between the end plate remote from said shoulders and said core to urge said core against said shoulders.

CARL G. KRONMILLER.